Sept. 13, 1960  H. R. MERRIMAN  2,952,579
HONEYCOMB SANDWICH PANEL STRUCTURE AND METHOD OF MAKING SAME
Filed July 14, 1955
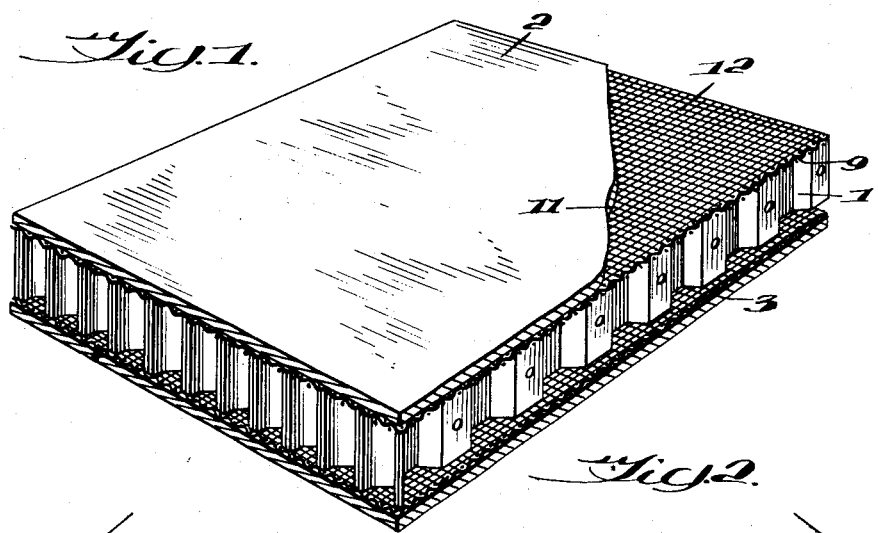
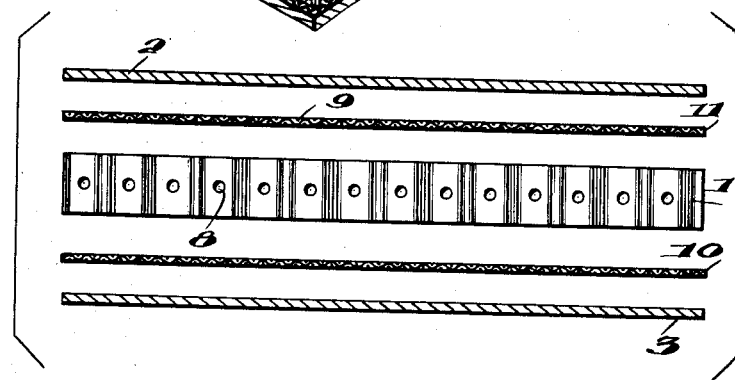
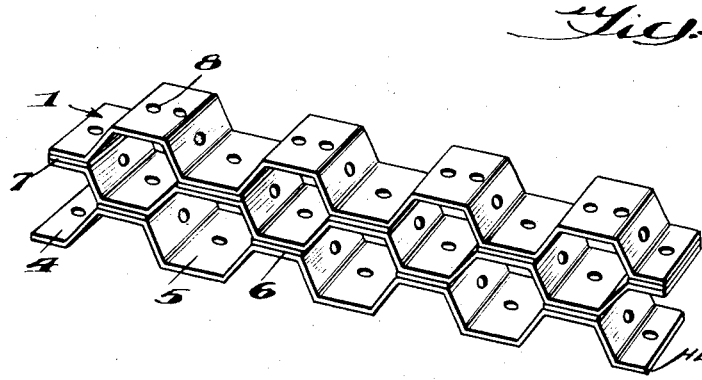
INVENTOR
HELEN R. MERRIMAN,
BY Benjamin G. Weil
ATTORNEY

United States Patent Office 2,952,579
Patented Sept. 13, 1960

2,952,579

HONEYCOMB SANDWICH PANEL STRUCTURE AND METHOD OF MAKING SAME

Helen R. Merriman, Towson, Md., assignor to The Martin Company, Middle River, Md., a corporation of Maryland Filed July 14, 1955, Ser. No. 522,116

4 Claims. (Cl. 154—127)

This application is a continuation-in-part of application Serial No. 267,531, filed January 22, 1952, now abandoned.

This invention relates, in general, to sandwich type panel construction and more particularly to a honeycomb structure and method of making the same wherein low-density, cellular core is interposed between outer surface sheets and adhesively bonded thereto.

The core construction which appears the most efficient from a strength-weight ratio standpoint for the type of loads it is to resist in a sandwich structure is a cellular one wherein the axes of the cells are generally normal to the plane of the core and surface sheets. In this construction, only the ends of the individual cell walls contact the outer sheets, thus providing only a small bonding area relative to the total planform area of the sheets in which to secure the core and sheets together. As a result, it is difficult to obtain a satisfactory bond.

A satisfactory bond not only requires a relatively thick layer of adhesive but also uniformity in the layer thickness since the maximum strength of the panel is no greater than the strength of the weakest bond area. By the conventional method of spreading a liquid adhesive between the core and sheets, considerable time and skill is required to obtain a uniform bond. Also, in order to provide a sufficiently thick layer of adhesive, a number of coats must be applied to the surfaces to be bonded, which further complicates the fabricating procedure.

An object of this invention is to provide an all metal honeycomb sandwich panel construction which may be readily fabricated by relatively unskilled workers to consistently produce a structure far superior to conventional sandwich construction.

Another object of this invention is to provide a reinforcing means for increasing the strength of the adhesive bond between the core and outer sheets.

Another object of this invention is to provide a sandwich construction which will not deteriorate in the presence of moisture and which has a high strength to weight ratio substantially unaffected by temperature variations.

Still another object of this invention is to provide a method for fabricating sandwich structures which is particularly adaptable to mass production work in that the difficult, time-consuming and critical step of applying a sufficiently thick and uniform coat of liquid adhesive to the core and surface sheets is eliminated.

Further and other objects will become apparent from the accompanying description and drawings which form a part of this disclosure and in which like numerals refer to like parts.

In the drawing:

Fig. 1 is a fragmentary three dimensional view of a portion of the honeycomb sandwich structure of this invention.

Fig. 2 is an exploded side view of a portion of the honeycomb sandwich structure shown in Fig. 1.

Fig. 3 is an enlarged three dimensional view showing the detail construction features of the low-density core forming a part of the sandwich structure shown in Fig. 1.

The sandwich structure shown in Fig. 1 includes a cellular metal foil core 1 interposed between a pair of metal surface sheets 2 and 3 wherein the core is adhesively bonded to the surface sheets by means of layers or sheets of thermosetting vinyl acetal-phenolic resin 9 and 10 reinforced with glass fibre, as will be more fully hereinafter described.

Metal surface sheets 2 and 3 cooperate with the metal foil core to produce an efficient structure which is relatively insensitive to atmospheric conditions and which has a high strength-to-weight ratio. Aluminum has been found to be a desirable and satisfactory material, because of its low weight, for this sandwich construction. Other materials could obviously be employed without departing from the teachings of this invention.

Core 1, as best shown in Fig. 3, is constructed generally in accordance with Patent No. 2,609,068, by stacking a plurality of corrugated metal foil strips 4 upon one another to form a plurality of hexagonally shaped cells 5. The crests 6 in the corrugated strips 4 are arranged face-to-face and abutting one another to provide regularly spaced bond areas. A layer 7 of thermosetting vinyl acetal-phenolic resin adhesive is applied to the bond areas formed by the corrugation crests 6. By the application of heat and pressure, the resin is cured, bonding the plurality of strips together and forming the unitary structure which is adapted to transmit stresses to the outer sheets 2 and 3. As shown in Fig. 3, each cell 5 in the core is composed of two pairs of opposed walls of single thickness and one pair of opposed walls of double thickness. It is also to be noted that each strip 4 in the core is provided with a plurality of perforations 8 for allowing the escape of any gases which may be generated when bonding the surface sheets to the core as hereinafter described.

The adhesive layers 9 and 10 as shown in Figs. 1 and 2 each comprise a fabric adhesive-carrier 11 imbedded within a layer of thermosetting adhesive composed of phenolic and vinyl resins. Such a thermosetting adhesive is composed of a phenol formaldehyde resin and a vinyl acetal resin. The phenol formaldehyde resin is prepared from phenol and formaldehyde by a conventional condensation reaction employing sufficient formaldehyde to produce a thermosetting product. Such an adhesive has a high modulus of elasticity and is known as a high modulus type adhesive as distinguished from low modulus adhesives such as rubber-based adhesives, thermoplastic adhesives and rubber phenolic blend adhesives. A high modulus vinyl-phenolic type thermosetting resin is satisfactory for structures bonding over a working range of —100° F. to 250° F. and has 100% peak efficiency in bonding aluminum, magnesium and ferrous metals over such a temperature range. Carrier 11 is constructed of a plurality of glass fibre threads 12 woven into an open or screen-like mesh wherein one family of threads is arranged to perpendicularly intersect a second family of threads.

The reinforced adhesive layers are made by dissolving a mixture of phenolic and vinyl resins of the type described above in a suitable solvent, immersing the carrier into the solution to allow a film of adhesive to adhere to and penetrate into the open meshes of the carrier, and then passing the carrier with the adhesive adhering thereto through a drying chamber which provides a flow of air maintained at a temperature sufficient to remove a high proportion of the solvent. By this process of removing most of the solvent from the mixture of phenolic and vinyl resins adhering to the carrier, the adhesive solidifies producing the glass fibre reinforced layers 9 and 10 employed for bonding surface sheets 2 and 3 to core 1. By repeating the dipping and drying process the thickness of the adhesive layers can be controlled and increased as desired. These reinforced adhesive layers may be prepared and stored for future use so that when a particular honeycomb structure is to be fabricated it can be done quickly and easily. The penetration of the adhesive resinous composition into the open meshes of the carrier causes an intimate and strong bond between the carrier and the adhesive adhering to the surfaces thereof.

To make the sandwich panel shown in Fig. 1, outer surface sheets 2 and 3 of the proper thickness, are cut to the desired planform dimensions. Core 1 is cut to the desired planform dimensions corresponding to the planform dimensions of the outer sheets and also to a desired thickness determined by the type and magnitude of the load to be applied. The bonding surfaces are cleaned and a thin film of the liquid adhesive described above is sprayed onto the bonding surface of each surface sheet 2 and 3 and on the open celled surfaces of the core to protect the cleaned surfaces during subsequent handling in manufacture of the panel. This step, like the others in the method, may be performed by a layman since the thickness and unformity of the film has substantially no effect on the strength of the finished article. While this step is not considered absolutely essential to the method, a superior bond does result by its inclusion. Layers 9 and 10 of fibre reinforced, dry adhesive film are placed over the open celled surfaces of the core. Then the metal surface sheets 2 and 3 are placed upon the adhesive layers 9 and 10 with the adhesive film protected side contiguous therewith so that the core and adhesive layers are sandwiched therebetween. As shown in the drawings, strips 4, making up the core, are arranged edgewise between the outer sheets so that the axes of the cells 5 extend generally normal to the plane of the panel. By applying heat and pressure to the assembly, using temperatures of 305° F. for thirty minutes minimum to 400° F. for five minutes minimum and pressures ranging from 5 to 100 p.s.i., the thermosetting resins in layers 9 and 10 and in the films undergo a curing process wherein the assembly of the core and outer sheets are securely bonded together to form a unitary structure. The adhesive layers 9 and 10 being of a definite controlled thickness, provide a bond of uniform strength over the entire planform area of the panel. Since these layers of reinforced adhesive are prepared prior to assemblying the sandwich structure for a particular application, all that is necessary for fabrication is to insert the dry adhesive film layers between the core and outer surface sheets, and then cure the adhesive in the assembly. A layman can perform these operations with ease. A good bond is not dependent upon applying numerous coats of liquid adhesive to the surfaces uniformly and to a specified thickness as is conventionally done.

The glass fibre network 11 imbedded in the layers of adhesive 9 and 10 provide structural reinforcement for increasing the strength of the layer of phenolic resin thereby increasing the ultimate strength of the panel. As a load is applied to the panel causing the adhesive layer to deflect under a stress, that deflection is resisted by the reinforcing glass fibre threads to materially increase the strength of the bond between the core and outer sheets. By arranging the glass fibres so that one family of threads extend in one direction and parallel to one another and a second family of threads extend parallel to one another and perpendicularly intersect the first family of threads, the carrier is capable of reinforcing the adhesive so as to resist stresses developed by loads applied in any direction.

It is obviously not essential that glass fibre threads be used as the reinforcing members in the adhesive layers, however, it is important that fibres having similar properties and strength characteristics be employed for this purpose since they are an actual structural element of the sandwich panel and as such are depended upon to sustain a part of the load. An important advantage in the use of glass fibre is that such material is relatively insensitive to moisture and heat, has a high tensile strength and adheres readily to the phenolic resin adhesive. While materials such as cotton which are subject to rot and mildew in the presence of moisture and those which are heat sensitive or highly resilient serve satisfactorily as a carrier for building up a desired thickness of adhesive, they do not provide structural reinforcement for increasing the strength of the adhesive. Such materials are therefore unsuitable where this latter feature of the invention is desired. Materials which adhere poorly to phenolic resins are unsatisfactory because they are not only incapable of strengthening the adhesive but also fail as a carrier to assist forming the adhesive layer.

Any gases which may be given off during the curing process in bonding the outer sheets 2 and 3 to core 1 are admitted to the atmosphere through the plurality of perforations 8 formed in strips 4 of core 1. If such gases were trapped in the cells of the core, an internal pressure would be built up in the panels to produce stresses even before an outside load is applied.

It is to be understood that certain changes, alterations, modifications and substitutions can be made without departing from the spirit and scope of the appended claims.

I claim:
1. A high-strength sandwich structure comprising a pair of metal surface sheets, a low-density, cellular metal honeycomb core interposed between said surface sheets with the direction of the cells extending normal to the metal surface sheets, whereby the edges of the cells are opposite the inner surfaces of said metal surface sheets, means for bonding the edges of said cellular honeycomb core structure to the respective metal surface sheets, said bonding means consisting of reinforcing, adhesive-carrying sheets of open-mesh, glass-fibre fabric embedded in a layer of adhesive, said adhesive layer consisting of a thermosetting phenol formaldehyde-vinyl acetal resin, the adhesive-carrying sheets being interposed between the cellular honeycomb core and each metal surface sheet, the layer of resin adhesive carried by said adhesive-carrying sheets directly contacting the edges of the honeycomb core and the metal surface sheets.

2. A high-strength sandwich structure as claimed in claim 1 in which the adhesive has a high modulus of elasticity.

3. A high-strength sandwich structure as claimed in claim 1 in which the cellular core consists of a plurality of corrugated foil strips with the corrugations of adjacent strips being bonded at spaced intervals.

4. The method of making a high-strength sandwich structure which comprises assembling a pair of metal surface sheets at each face of a low-density cellular honeycomb core with the edges of the cells at the open ends thereof opposite the surface sheets, interposing between each face of said core and its adjacent surface sheet a bonding sheet of open-mesh, glass-fibre fabric embedded in a layer of adhesive consisting of an uncured, dry, substantially solvent-free, thermosetting phenol formaldehyde-vinyl acetal resin, applying pressure to the assembled structure to cause the surface sheets and the edges of the cells of the cellular core to be forced against the adhesive of the interposed bonding sheet, and, while maintaining said pressure, applying heat to the adhesive in an amount sufficient to cure and impart a final set thereto in situ and to bond said adhesive layers directly to said surface sheets and the edges of the cells of said cellular core.

(References on following page)

References Cited in the file of this patent

UNITED STATES PATENTS

| | | |
|---|---|---|
| 2,234,517 | Coffman | Mar. 11, 1941 |
| 2,261,983 | Ford | Nov. 11, 1941 |
| 2,403,077 | Hershberger | July 2, 1946 |
| 2,441,542 | Lawrence | May 11, 1948 |
| 2,517,218 | Lawrence | Aug. 1, 1950 |
| 2,609,068 | Pajak | Sept. 2, 1952 |
| 2,650,185 | Larson et al. | Aug. 25, 1953 |
| 2,742,387 | Giuliani | Apr. 17, 1956 |

FOREIGN PATENTS

| | | |
|---|---|---|
| 577,823 | Great Britain | June 3, 1946 |